United States Patent Office 3,252,756
Patented May 24, 1966

3,252,756
OXIDATION AND RECOVERY OF VANADIUM VALUES FROM ACIDIC AQUEOUS MEDIA
Mayer B. Goren, Golden, Colo., assignor to Kerr-McGee Oil Industries, Inc., a corporation of Delaware
No Drawing. Filed July 12, 1962, Ser. No. 209,278
25 Claims. (Cl. 23—14.5)

This invention relates to the oxidation of iron and/or vanadium values contained in an acidic aqueous medium. In some of its more specific aspects, the invention further relates to the recovery of vanadium values from acidic aqueous medium by a novel process including biological oxidation of the vanadium to the plus 5 oxidation state, followed by precipitation of the oxidized vanadium values. The invention also relates to the biological oxidation of ferrous iron values in acidic aqueous medium in the presence of vanadium and/or uranium values.

There are a number of processes where it is desirable to oxidize the ferrous iron content of an acidic aqueous medium in the presence of vanadium values and/or uranium values. For example, in the acid leaching of uranium ores usually aqueous sulfuric acid containing ferric ion as an oxidant is circulated through a bed of uranium ore to thereby oxidize the uranium content and solubilize it. When a vanadium-uranium ore is being leached, the resultant leach liquor contains both uranium and vanadium values in addition to ferrous ion and impurities such as phosphate. The ferric ion of the leach liquor is reduced to ferrous ion during the leaching step and it is necessary to oxidize the ferrous ion to the ferric state before recirculating the leach liquor through the ore for solubilizing additional uranium. Normally, the oxidation is effected by addition of a chemical oxidant such as sodium chlorate but this is expensive and lower cost oxidants have been sought for many years.

In accordance with one variant of the invention, it is possible to biologically oxidize the ferrous iron content of an acidic aqueous medium containing vanadium values and/or uranium values. If desired, it is also possible to continue the biological oxidation until the vanadium values are oxidized to the plus 5 oxidation state. Thus the invention is useful in numerous applications including those where only the ferrous iron is oxidized to the ferric state and those where both the ferrous iron and vanadium are oxidized.

One important variant of the invention provides a novel process for the acid leaching of uranium ores in which the ferrous ion content of the acidic leach solution is biologically oxidized at a small fraction of the usual cost when employing chemical oxidants. When the leach solution contains vanadium values, the vanadium values also may be biologically oxidized to the plus 5 oxidation state to thereby provide an additional oxidant for the uranium. The resultant acidic leach solution containing ferric ion and plus 5 vanadium is a highly effective and desirable medium for leaching various uranium ores and may be employed following usual acid leaching practices.

In accordance with another variant of the invention, it is possible to biologically oxidize and recover vanadium values from acidic aqueous media. A wide variety of acidic aqueous media containing vanadium values may be treated by known processes to produce a satisfactory commercial vanadium oxide product. One source of vanadium-containing solutions is leach liquors obtained by leaching vanadium ores with aqueous sulfuric acid. Vanadium-containing leach liquors resulting from leaching vanadium-uranium ores are especially important. If desired, the uranium may be first recovered from the leach liquor with ion exchange materials or by solvent extraction to produce a uranium-barren leach liquor containing varying amounts of substances together with the vanadium, including iron and aluminum. Normally the vanadium is present in relatively small amounts. Uranium-barren leach liquors often contain vanadium in amounts less than 0.5 g./l. when calculated as $V_2O_5$ and usually most of the vanadium is in the plus 4 oxidation state. In such instances, the processing of low grade vanadium liquors is expensive due largely to the high cost of chemicals for oxidizing the vanadium and fuel for heating the liquor to elevated temperature.

A variety of processes may be used to recover vanadium from a solution containing low concentrations. If the system is highly oxidized with the vanadium being in the plus 5 oxidation state, then heating the solution to the boiling point at a pH value of 2 to 2.5 results in the precipitation of a low grade vanadium product assaying 20–25% $V_2O_5$ with a recovery of above 80–85%. However, the necessity for heating large quantities of liquor from ambient temperature to the boiling point is uneconomic even in instances where the system is already in a highly oxidized state. Also, the vanadium must be first oxidized with expensive chemical oxidants when it is present in a valence state less than plus 5.

A second process for recovering vanadium quantitatively from its dilute solutions is to oxidize the solution with chemical oxidants and maintain it at a reasonably oxidized level, although it may be completely oxidized, and then adjust the pH of the solution to about 3–3.5. Under these conditions, all of the vanadium, ferric iron, and phosphate are precipitated to yield a product when limestone is the precipitating agent that contains 3–5% $V_2O_5$. This product requires extensive upgrading before it may be converted into a vanadium oxide product of commerce such as 98% $V_2O_5$.

In each of the above processes, when the vanadium is present in the plus 4 oxidation state it is desirable that the vanadium be first oxidized to the plus 5 oxidation state, and then recovered from the dilute aqueous solution by precipitation in the oxidized state. Also, it is necessary to heat the oxidized solution to an elevated temperature at a pH of 2–2.5 in order to effect the precipitation of a product containing at least 20–25% $V_2O_5$. The cost of the chemical oxidizing agent, as well as the cost of heating the solution to an elevated temperature, often render the processes uneconomic and especially in instances where both oxidation and heating must be effected on a relatively low grade vanadium-containing liquor.

The present invention provides a process for the recovery of vanadium values whereby vanadium-containing liquors, and especially relatively low grade liquors containing less than 0.5 g./l. of vanadium calculated as $V_2O_5$, may be readily and economically oxidized to provide a liquor containing vanadium in the plus 5 oxidation state. The resultant oxidized vanadium may be readily recovered by precipitation or by other known processes. The invention further provides a novel process for oxidizing and precipitating vanadium values from dilute acidic aqueous solution that does not require an expensive chemical oxidant or high temperatures. The invention further provides a novel process for effecting the biological oxidation of vanadium values in acidic aqueous medium whereby the microorganisms responsible for the oxidation may be supported in intimate contact with the aqueous medium in such a manner that they thrive and multiply rapidly, the microorganisms may be recycled in the process, and the precipitated vanadium product may be recovered without processing difficulties. Thus, the present invention provides for the first time a highly efficient and inexpensive process for recovering vanadium values having a valence less than plus 5 from acidic aqueous solution in the form of a precipitated oxidized vanadium product which may be readily upgraded to high purity vanadium products of commerce.

It is an object of the present invention to provide a novel process for oxidizing ferrous iron and/or vanadium values contained in an acidic aqueous medium.

It is a further object of the invention to provide an acidic leach solution containing ferric ion and vanadium in the plus 5 oxidation state which is useful in the acid leaching of uranium ores.

It is still a further object of the invention to provide a novel process for recovering vanadium values from an acidic aqueous medium.

It is still a further object of the invention to provide a novel process for effecting the biological oxidation of ferrous iron and/or vanadium values in acidic aqueous medium in which the microorganisms responsible for the oxidation are supported in the aqueous medium in such a manner that they thrive and multiply rapidly.

It is still a further object of the invention to provide a novel process for the recovery of vanadium having a valence less than plus 5 from dilute acidic aqueous solution including biological oxidation of the vanadium to the plus 5 oxidation state and precipitation of the oxidized vanadium values at low temperature as a product which may be readily upgraded to a high purity vanadium product of commerce.

Still other objects and advantages of the invention will be apparent to those skilled in the art upon reference to the following detailed description and the examples.

In accordance with the present invention, an acidic aqueous medium containing ferrous iron and vanadium and/or uranium is biologically oxidized in the presence of a strain of oxidizing bacteria to be more specifically defined hereinafter. The ferrous iron may be oxidized to the ferric state and, if desired, vanadium values when present may be oxidized to the plus 5 or pentavalent state. A solution containing vanadium values in a valence state less than plus 5 also may be oxidized to thereby produce a pentavalent vanadium solution.

The strain of bacteria useful in the process of the present invention are non-spore forming, rod shaped, motile, autotrophic oxidizing bacteria which have the ability to oxidize ferrous ion to ferric ion and also to oxidize vanadium from lower valence states to the plus 5 oxidation state. Usually, the bacteria are approximately 0.5 to 1.0 micron in width and 1 to 2 microns in length, and derive their energy from the oxidation of ferrous iron or the oxidation of vanadium in valence states lower than plus 5, and perhaps to some extent by the oxidation of other substances such as sulfur which may be present. They are capable of using carbon dioxide as a source of carbon, and organic materials are not essential for their growth. They require an acidic aqueous medium for growth.

In their naturally occurring state, the bacteria from which the strain of the invention is developed seem to be substantially identical with *Ferrobacillus ferrooxidans, Thiobacillus ferrooxidans,* or oxidizing bacteria found in copper and iron containing mine waters in the Brainard Lake area of Colorado and the Idaho Springs area of Colorado, with the exception of exhibiting a low tolerance for certain heavy metal values. In their natural state they do not appear to exhibit a tolerance to any substantial degree to appreciable concentrations of uranium and vanadium values.

The American Type Culture Collection, 2112 M Street, NW., Washington 7, D.C., has given collection catalog number 13,661 to a strain of *Ferrobacillus ferrooxidans* and number 13,598 to a strain of *Thiobacillus ferrooxidans* which may be used in developing a strain of bacteria for practicing the present invention. The bacteria which occur in the mine waters mentioned above also may be used and are very satisfactory for use in developing a desirable strain of bacteria. However, all of these types of bacteria must be artificially bred or grown to obtain a strain which exhibits a satisfactory tolerance to vanadium and/or uranium.

In obtaining a desired strain for use in practicing the present invention, the bacteria are artifically grown or bred successively over many generations to the appropriate tolerance for vanadium and/or uranium values. This may be accomplished by growing a culture of the bacteria in a culture medium containing vanadium and/or uranium values which is synthetic in nature and tolerated by the bacteria. By gradually building up the concentration of the vanadium and/or uranium in the culture medium and the tolerance of the bacteria to these substances, and if desired other substances which are present in the leach liquors of uranium and vanadium ores, it is possible to obtain a strain of the bacteria which is satisfactory for practicing the present invention. The soluble compounds of vanadium and/or uranium may be added to the culture medium in small amounts gradually over a period of many weeks, until the bacteria have the desired degree of tolerance. In instances where the solution to be oxidized contains no uranium, then the bacteria need only be tolerant to the vanadium values and other substances which may be present in the solution. Similarly, if no vanadium is present in the solution and ferrous values are to be oxidized in the presence of uranium values, then the bacteria need not be tolerant to vanadium. However, when both uranium and vanadium values are present, then tolerance to both of these substances must be obtained.

In the foregoing manner, when the vanadium is calculated as $V_2O_5$ it is possible to develop a tolerance to low levels such as 0.1 g./l. of $V_2O_5$ and high levels such as up to 0.5 g./l. $V_2O_5$. It may also be possible to develop a tolerance to 1, 5, 10, 15 or 20 g./l. of vanadium when calculated as $V_2O_5$. Usually it is only necessary to obtain a strain of bacteria which is tolerant to 0.4–0.5 g./l. of $V_2O_5$ or less, since dilute leach liquors are normally processed in the industry. Usually a tolerance to uranium between about 0.2 g./l. and up to about 1–2 g./l. of $U_3O_8$ is satisfactory since relatively dilute uranium solutions are normally encountered in practice. When it is desirable it also may be possible to develop a tolerance to high concentrations of uranium such as 5–15 to 20–25 g./l. when calculated as $U_3O_8$. The bacteria are naturally tolerant to high concentrations of iron such as 5–10 to 20–25 g./l. A tolerance to other metal values which may be present in the leach solution to be oxidized also may be developed such as, by way of example only, 15,000–20,000 p.p.m. (parts per million) of zinc, 10,000–15,000 p.p.m. of copper, 5,000–10,000 p.p.m. of aluminum, 100–200 p.p.m. of molybdenum, 3,000–4,000 p.p.m. of manganese, 5,000–10,000 p.p.m. of calcium and 2,000–3,000 p.p.m. of magnesium. The bacteria seem to tolerate the usual concentrations of alkali metals encountered without any difficulty.

It is also possible to grow a strain of bacteria which is tolerant to the conditions under which the bacteria are to be used such as the temperature and pH of the solution to be oxidized. The bacteria may be bred to tolerate desired conditions of temperature and pH in a manner analogous to developing tolerance to vanadium and/or uranium. Care is taken to first use temperature and pH conditions which the growing bacteria will tolerate, and then the conditions are changed gradually over a long period of time toward those under which it is desired to operate.

The aqueous medium containing the iron and/or vanadium values to be oxidized should be maintained at a temperature above the freezing point and not greater than about 50° C. Thus, the operating temperature should range between about 0° C. and about 50° C. The preferred temperature range for practical operation is usually between about 15° C. and 40° C., with best results usually being obtained at about 35° C.

The aqueous medium containing the iron and/or vanadium to be oxidized must be acidic. However, wide pH levels are possible when the bacteria are properly artificially bred to establish a desired degree of tolerance. The bacteria are very active at pH levels as low as about 0.8–.9 and as high as about 3. In most instances, a pH range between about 1.1–1.2 and 2.6–2.8 is preferred. Within this range, it is usually possible to have the oxidation proceed at a pH of about 1.5±0.2 and maintain oxidized metal values in solution when this is desirable. However, in instances where it is desirable to have oxidized metal values precipitate from solution as the oxidation proceeds, then a pH of about 2.5±0.3 usually is preferred.

The bacteria are allowed to multiply and grow within the acidic aqueous media containing ferrous iron and/or vanadium values to be oxidized under the above-mentioned conditions of temperature and pH. Normally the bacteria will multiply in leach liquors to provide a suitable concentration for the oxidation to proceed at a satisfactory rate, but usually better results are obtained by adding nutrients and especially a source of nitrogen such as a nitrate or ammonium salt. For instance, alkali metal nitrates or ammonium mineral acid salts may be added in quantities to provide about 1 to 200 p.p.m. (parts per million) of nitrogen in the resultant solution. About 0.1–0.25 g./l. of ammonium sulfate has been found to be very satisfactory as a source of nitrogen. It is also desirable in some instances to add traces of soluble salts of metals such as cobalt, magnesium and manganese. Most leach liquors contain phosphorus, potassium and other substances necessary for growth of the bacteria. In instances where the solution fails to contain elements essential for growth of the bacteria, it is understood that they are added.

The oxidation rate may be improved markedly by aerating the solution with air, or any satisfactory elemental oxygen-containing gas. In instances where carbon dioxide is not present in the solution in sufficient amount, then the elemental oxygen-containing gas should also contain carbon dioxide as the bacteria normally depend upon it for a source of carbon. Usually it is preferred that the aeration be vigorous, and often sufficiently vigorous to agitate the solution.

The oxidation rate may be further improved by providing a satisfactory support for the multiplying and growing microorganisms. Satisfactory supporting materials of extended surface area include volcanic rock or other suitable rocks, and other inert materials in general which may be used to provide an extended surface area and which are sufficiently heavy to remain in place within a vat or other container during aeration of the solution. It is also possible to provide as a support inert materials which are sufficiently finely divided or sufficiently light to be suspended in the aqueous medium, whether by agitation or due to low specific gravity, and thereby provide a mobile support in particulate form for the microorganisms. This has the advantage of allowing the oxidized metal values to precipitate on the moving particles and thereby prevent the particles from being cemented together by deposited substances as the oxidation proceeds. A particulate support is especially desirable in the oxidation of vanadium values at a pH value of 2.5 to 3 as the vanadium is precipitated on the particles as iron vanadate. In instances where the support is stationary such as a bed of rock, the rocks are cemented together by the precipitated material and eventually the flow of liquid through the bed is reduced or even prevented.

In instances where it is desired to recover dissolved vanadium values as iron vanadate, the moving support embodiment discussed above has many advantages. It is possible to oxidize the solution at a pH sufficiently high for the iron vanadate to precipitate and the particles of precipitate form a support for the growing microorganisms. Additional iron vanadate precipitates on the particles as the oxidation proceeds. The precipitated iron vanadate may be recovered from the solution and a quantity of the precipitate together with the bacteria supported thereby placed in additional solution to be oxidized to act as a supporting material and a source of bacteria.

The present invention also provides a novel continuous process for the recovery of vanadium values from leach liquors. For instance, a plurality of vessels containing a supporting material such as a bed of rock or the precipitated iron vanadate may be provided, and the leach liquor containing vanadium values and iron values passed successively through the plurality of vessels at a rate to assure oxidation of the iron and vanadium values upon removal from the last vessel in the series. The pH is adjusted to a value causing the precipitation of iron vanadate on the supporting material. In instances where a mobile support is provided, a portion of the supporting material may be recycled to the first vessel in the process along with the microbes which are supported thereon and the remainder retained as product. In instances where a rock bed is used as the support, when sufficient precipitate has collected on the rock bed of a given vessel, it is taken off stream and the precipitate is dissolved with mineral acid or other solvent and then the vessel is placed back on stream. The iron vanadate product contains about 25% $V_2O_5$ and may be upgraded following conventional practices in the art.

The oxidation of the ferrous and/or vanadium values may be allowed to proceed for any satisfactory period of time sufficient to accomplish the desired degree of oxidation. In instances where both the ferrous iron and the vanadium are to be oxidized, the oxidation is allowed to proceed until all of the ferrous iron is oxidized to the ferric oxidation state, and the vanadium is then oxidized to the plus 5 oxidation state. When a portion or all of the ferrous iron is to be oxidized to the ferric state, then the oxidation is allowed to proceed for such period of time as is sufficient to achieve the desired degree of ferrous iron oxidation. If only the iron is to be oxidized, then the oxidation may be allowed to proceed to a negative E.M.F. (electromotive force) of about −500 to −550 mv. (millivolts). When the vanadium as well as the iron is oxidized, then the oxidation may be continued until the E.M.F. is −600 mv., or a higher negative value such as −650 mv. (In the specification and claims, it is understood that the E.M.F. measurements are made with platinum vs. calomel electrodes at a pH value of 0.5 to 1.5.)

The foregoing detailed description and the following specific examples are for purposes of illustration only, and are not intended as being limiting to the spirit or scope of the appended claims.

*Example I*

This example illustrates the oxidation of ferrous iron values in the presence of vanadium and uranium.

The leach liquor used in this example was obtained by conventional sulfuric acid leaching of a carbonaceous uranium ore of the Ambrosia Lake type. The leach liquor contained 1 g./l. of uranium values calculated as $U_3O_8$, 0.3 g./l. of tetravalent vanadium values when calculated as $V_2O_5$, 0.5 g./l. of ferric iron values calculated as Fe, 2.5 g./l. of ferrous iron values calculated as Fe, 0.3 g./l. of phosphate values calculated as $P_2O_5$, 8 g./l. of aluminum values calculated as $Al_2O_3$ and 1 g./l. of dissolved or colloidally dispersed silica calculated as $SiO_2$.

The bacteria used in this example was a strain artificially bred to tolerate the presence of vanadium and uranium values and the other constituents of the above identified leach liquor. The strain was developed from naturally occurring oxidizing bacteria obtained from copper and iron containing mine waters found in the Brainard Lake area and the Idaho Springs area of Colorado. The original bacteria were unable to thrive and multiply rapidly in the leach liquor. However, after growing successive generations of the bacteria in acidic aqueous media containing lower concentrations of the various constituents of the leach liquor, followed by gradually increasing the concentrations of the constituents over a long period of time, it was possible to arrive at a strain of bacteria which was capable of rapidly oxidizing both iron and vanadium values over a pH range of about 0.8 to 3 and at a temperature of 15° C. to 40° C. It was this strain of artificially bred bacteria that was used in this and subsequent examples.

The bacteria used in this example were non-spore forming, rod shaped, motile, autotrophic, oxidizing bacteria. They appeared to be identical with bacteria usually identified as *Thiobacillus ferrooxidans* or *Ferrobacillus ferrooxidans* with the exception of having the ability to grow and thrive in the above-identified leach liquor, and the ability to oxidize the ferrous values and vanadium values contained therein to the ferric and plus 5 valence states, respectively, in a practical period of time.

A vat was partially filled with volcanic rock and then charged with the above-identified leach liquor. Then, the strain of bacteria identified above was charged to the vat. The leach liquor was aerated vigorously and the electromotive force (E.M.F.) recorded periodically. The pH of the leach liquor was about 2.0.

The negative E.M.F. gradually rose and when it reached approximately −500 to −550 millivolts, substantially no ferrous ion was present in the solution. Thus, the ferrous iron had been substantially completely oxidized to the ferric oxidation state. At this time, very little if any vanadium was oxidized from the plus 4 to the plus 5 oxidation state.

The oxidation was allowed to continue until the E.M.F. reached −600 millivolts. At that time, it was found that substantially all of the vanadium values were in the plus 5 oxidation state.

*Example II*

The general procedure of Example I was repeated with the exception of first solvent extracting the uranium from the leach liquor. The resultant uranium-barren leach liquor was used in this example and it contained substantially all of the original constituents other than the uranium.

The results obtained in this example were substantially the same as those recorded in Example I.

*Example III*

The general procedures of Examples I and II were repeated with the exception of using strains of bacteria developed from bacteria identified as *Ferrobacillus ferrooxidans* (American Type Culture Collection Catalog No. 13,661) and *Thiobacillus ferrooxidans* (American Type Culture Collection Catalog No. 13,598).

The results obtained with these two new strains of bacteria were not as good as obtained with the strain of bacteria of Example I as the bacteria were not as active. However, both the iron and the vanadium could be oxidized in a practical period of time.

*Example IV*

The procedure of Example II was followed with the exception of removing the rocks from the vat and employing finely divided vermiculite as the supporting medium for the bacteria. The vermiculite was sufficiently light to remain suspended in the leach liquor, but was agitated to provide a more uniform suspension by means of the air used in aeration.

The results obtained were substantially the same as noted in Example II.

The above procedure may be modified by substituting finely divided silica (sand) for the vermiculite. The silica is maintained in suspension by vigorous agitation to thereby provide a support for the bacteria.

A product containing about 20–25% $V_2O_5$ could be precipitated from the above oxidized leach liquors upon adjusting the pH to 2.5 and heating to the boiling point. Also, the liquors could be neutralized to a pH of about 3.25 with limestone to thereby obtain a sludge containing about 3–5% of $V_2O_5$. Either of these vanadium-containing materials could be upgraded by dissolving in sulfuric acid at a pH of 1.2, followed by filtering, and heating the acid solution to its boiling point to thereby precipitate the vanadium values as a product containing about 60–70% $V_2O_5$. The resultant vanadium product could be further upgraded following conventional procedures to produce a 98% $V_2O_5$ vanadium product of commerce following the usual red cake precipitation conditions well known to the art.

*Example V*

The procedure of Example II was followed with the exception of removing the volcanic rock from the vat and adjusting the pH of the leach liquor to 2.6 and the temperature to 35° C.

As the oxidation progressed, crystals of iron vanadate formed in the leach liquor. The crystals were found to serve as very effective supports for the growing bacteria and also to provide an excellent base for precipitating the vanadium values as iron vanadate as the oxidation progressed. The particles of iron vanadate were kept suspended by means of vigorous aeration.

In subsequent runs, even better results were obtained by recovering the iron vanadate precipitate obtained in the first run, and immeditaely adding a portion of it directly to a vat containing a fresh charge of leach liquor. The oxidation commenced almost immediately and proceeded at a very fast rate until completion.

The resultant precipitate contained about 10–20% $V_2O_5$ and could be upgraded following conventional practices of the art.

*Example VI*

This example illustrates continuous operation to produce a vanadium-containing precipitate which may be readily upgraded to a commercial vanadium product.

The leach liquor and strain of bacteria used in this example were the same as those employed in Example II.

A series of vats were prepared and filled with volcanic rocks. Then, leach liquor at a pH of 2.6 and a temperature of 35° C. was passed continuously and successively through the vats in the series. The vats were inoculated with the strain of bacteria of Example I and aerated vigorously during the oxidation.

The iron and vanadium values were oxidized and the vanadium precipitated on the rocks as iron vanadate together with small amounts of calcium sulfate. With continued operation, the rocks were coated and cemented together by the precipitate and the rock bed resisted the flow of the leach liquor. At this point, the vats were drained and the precipitate was stripped from the rocks with strong sulfuric acid to thereby provide a sulfuric acid solution containing 15–18 g./l. of vanadium values calculated as $V_2O_5$. On allowing the sulfuric acid solution to stand or upon heating to the boiling point, a vanadium product precipitated containing above 70% $V_2O_5$. This precipitate was filtered from the solution and could be readily upgraded to a 98% $V_2O_5$ product of commerce following conventional procedures.

The pH of the sulfuric acid solution separated from the precipitate was adjusted to about 3.25 and a lower grade vanadium-containing precipitate was obtained which could be further purified in accordance with conventional practice.

The procedure of this example may be modified by periodically taking the first vat in the series off stream when the rock bed therein tends to become plugged with precipitate, and placing a clean vat at the end of the series. The vat taken off stream may be treated with sulfuric acid for removal of the precipitate, and then placed back on stream in its turn at the end of the series.

It is also possible to remove the rocks from the series of vats described in this example, and substitute a particulate material such as vermiculite or sand as a support for the growing bacteria and on which the precipitate forms during the oxidation. Such particulate supports are inert to the environment and are nontoxic to the bacteria. They may be maintained in suspension by vigorous agitation, and often by the aeration alone. There is no tendency for the particles to cement together and plug the vats as described above for the rock bed. The precipitate may be removed from the particles periodically by leaching in sulfuric acid and the particles re-used in the process.

*Example VII*

A series of vats was charged successively and continuously with the leach liquor of Example II at a pH of 2.6 and a temperature of about 30° C. Iron vanadate crystals were added to the first vat in the series, and the strain of bacteria of Example I was also added to the first vat in the series. Each of the vats in the series was vigorously agitated with air during the oxidation.

The aeration maintained the iron vanadate crystals in suspension and the oxidation was found to commence immediately. As the oxidation progressed, the oxidized vanadium values were precipitated on the suspended crystals as iron vanadate. A slurry of oxidized liquor and precipitated iron vanadate was removed continuously from the last vessel in the series and the iron vanadate crystals recovered therefrom. A portion of the iron vanadate crystals was returned continuously to the first vessel in the series, and the remainder retained as product. The iron vanadate product contained about 10–20% of vanadium when calculated as $V_2O_5$, and could be readily upgraded to 98% $V_2O_5$ following conventional practices.

What is claimed is:

1. A process for oxidizing ferrous iron and vanadium values comprising maintaining in an acidic aqueous medium containing ferrous iron values and vanadium values in a valence state less than plus 5, an effective quantity of live non-spore forming, rod shaped, motile, autotrophic, oxidizing bacteria to oxidize the said ferrous iron and vanadium values, the acidic aqueous medium having a pH value between about 0.8 and 3 and a temperature between about 0° C. and 50° C., the bacteria being tolerant to the acidic aqueous medium and capable of oxidizing the said ferrous iron and vanadium values to the ferric and plus 5 oxidation states, respectively, and at least a portion of each of the said ferrous iron and vanadium values being oxidized to the ferric and plus 5 oxidation states respectively by the bacteria.

2. The process of claim 1 wherein the acidic aqueous medium is subjected to aeration.

3. The process of claim 1 wherein the acidic aqueous medium is oxidized by the bacteria to a negative E.M.F. of at least −500 millivolts and substantially all of the ferrous iron values are oxidized.

4. The process of claim 1 wherein the acidic aqueous medium contains vanadium values and uranium values.

5. The process of claim 1 wherein the acidic aqueous medium has a pH value between about 0.8 and less than 2.5 and a temperature between about 15° C. and 40° C., and the acidic aqueous medium is subjected to aeration and oxidized to a negative E.M.F. of at least −500 millivolts.

6. A process for oxidizing vanadium values contained in an acidic aqueous medium comprising maintaining in the acidic aqueous medium an effective quantity of live non-spore forming, rod shaped, motile, autotrophic, oxidizing bacteria to oxidize vanadium values, the acidic aqueous medium having a pH value between about 0.8 and 3 and a temperature between about 0° C. and 50° C., the bacteria being tolerant to the acidic aqueous medium and capable of oxidizing vanadium present in the vanadium values to the plus 5 oxidation state, at least a portion of the vanadium present initially in the vanadium values being in a valence state less than plus 5 and being oxidized to the plus 5 oxidation state by the bacteria.

7. The process of claim 6 wherein the acidic aqueous medium is subjected to aeration.

8. The process of claim 6 wherein the acidic aqueous medium is oxidized by the bacteria to a negative E.M.F. of at least −600 millivolts.

9. The process of claim 6 wherein the acidic aqueous medium has a pH value between about 0.8 and 3 and a temperature between about 15° C. and 40° C., and the acidic aqueous medium is subjected to aeration and oxidized by the bacteria to a negative E.M.F. of at least −600 millivolts.

10. A process for obtaining a vanadium-containing material from an acidic aqueous medium containing dissolved vanadium values and iron values comprising maintaining in the acidic aqueous medium an effective quantity of live non-spore forming, rod shaped, motile, autotrophic, oxidizing bacteria to oxidize vanadium values, the acidic aqueous medium having a pH value between about 0.8 and 3 and a temperature between about 0° C. and 50° C., the bacteria being tolerant to the acidic aqueous medium and capable of oxidizing vanadium present in the vanadium values to the plus 5 oxidation state, at least a portion of the vanadium present initially in the vanadium values being in a valence state less than plus 5 and being oxidized to the plus 5 oxidation state by the bacteria, and precipitating oxidized vanadium values from the acidic aqueous medium as an iron and vanadium-containing precipitate.

11. The process of claim 10 wherein the pH value of the acidic aqueous medium is between about 2.5 and 3.0.

12. The process of claim 10 wherein the acidic aqueous medium is subjected to aeration.

13. The process of claim 10 wherein the acidic aqueous medium is oxidized by the bacteria to a negative E.M.F. of at least about −550 to −600 millivolts.

14. The process of claim 10 wherein the acidic aqueous medium has a pH value between about 2.5 and 3.0 and a temperature between about 15° C. and 50° C., and the acidic aqueous medium is subjected to aeration and oxidized by the bacteria to a negative E.M.F. of at least about −550 to −600 millivolts.

15. The process of claim 10 wherein the acidic aqueous medium has a pH between about 2.5 and 3.0, the acidic aqueous medium is in contact with a supporting material while it is being oxidized and the iron and vanadium-containing precipitate forms on the supporting material during the oxidation.

16. The process of claim 15 wherein the supporting material is a bed of rock.

17. The process of claim 15 wherein the supporting material is in the form of particles suspended in the acidic aqueous medium.

18. The process of claim 15 wherein the supporting material is particles of iron and vanadium-containing precipitate suspended in the acidic aqueous medium.

19. A process for obtaining a vanadium-containing material from an acid leach liquor containing vanadium values and ferrous iron values comprising passing the acid leach liquor through a series of zones having a supporting material therein, the leach liquor having a pH value between about 2.5 and 3.0 and a temperature between about 0° C. and 50° C., maintaining in the leach liquor in the series of zones an effective quantity of live non-spore forming, rod shaped, motile, autotrophic, oxidizing bacteria to oxidize vanadium values, the bacteria being supported in the leach liquor by the supporting material in the series of zones and being tolerant to the leach liquor, the bacteria being capable of oxidizing vanadium present in the vanadium values to the plus 5 oxidation state and iron in the ferrous iron values to the ferric oxidation state, at least a portion of the vanadium present initially in the vanadium values being in a valence state less than plus 5 and being oxidized to the plus 5 oxidation state by the bacteria and oxidized vanadium values precipitating on the supporting material as an iron and vanadium-containing precipitate.

20. The process of claim 19 wherein the supporting material comprises a bed of rock.

21. The process of claim 19 wherein at least a portion of the supporting material is in the form of particles suspended in the leach liquor.

22. The process of claim 19 wherein at least a portion of the supporting material is in the form of particles of iron and vanadium-containing precipitate suspended in the leach liquor.

23. The process of claim 19 wherein the supporting material comprises particles suspended in the leach liquor and a portion of the particles having bacteria thereon is recycled to the series of zones as supporting material and to provide a source of bacteria for the series of zones.

24. The process of claim 19 wherein the leach liquor is separated from supporting material having iron and vanadium-containing precipitate thereon, and the iron and vanadium-containing precipitate is upgraded by dissolving in mineral acid and re-precipitating the vanadium as a higher grade vanadium-containing product.

25. The process of claim 19 wherein the leach liquor has a temperature of about 15–50° C., and the leach liquor is subjected to aeration and oxidized by the bacteria to a final negative E.M.F. of at least about —550 to —600 millivolts.

References Cited by the Examiner
UNITED STATES PATENTS
2,829,964  4/1958  Zimmerley et al.

LEON D. ROSDOL, *Primary Examiner.*

C. D. QUARFORTH, *Examiner.*

J. D. VOIGHT, S. TRAUB, *Assistant Examiners.*